United States Patent
Zhu

(10) Patent No.: US 12,524,945 B2
(45) Date of Patent: Jan. 13, 2026

(54) WATERWAVE SIMULATION METHODS AND APPARATUSES, ELECTRONIC DEVICES, AND STORAGE MEDIA

(71) Applicant: BOE Technology Group Co., Ltd., Beijing (CN)

(72) Inventor: Danfeng Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 606 days.

(21) Appl. No.: 17/914,170

(22) PCT Filed: Sep. 27, 2021

(86) PCT No.: PCT/CN2021/120898
§ 371 (c)(1),
(2) Date: Sep. 23, 2022

(87) PCT Pub. No.: WO2023/044896
PCT Pub. Date: Mar. 30, 2023

(65) Prior Publication Data
US 2024/0221272 A1     Jul. 4, 2024

(51) Int. Cl.
*G06T 13/60* (2011.01)
*G06T 7/60* (2017.01)
(Continued)

(52) U.S. Cl.
CPC .............. *G06T 13/60* (2013.01); *G06T 7/60* (2013.01); *G06T 15/04* (2013.01); *G06T 17/20* (2013.01); *G06T 2210/24* (2013.01)

(58) Field of Classification Search
None
See application file for complete search history.

(56) References Cited

U.S. PATENT DOCUMENTS

2018/0012392 A1*  1/2018  Kryachko ............. G06T 15/005
2019/0362035 A1* 11/2019  Jeschke .................. G06T 13/60
(Continued)

FOREIGN PATENT DOCUMENTS

CN       102663827 A    9/2012
CN       112435304 A    3/2021

OTHER PUBLICATIONS

PCT/CN2021/120898 international search report.
(Continued)

*Primary Examiner* — Joni Hsu
(74) *Attorney, Agent, or Firm* — IPro, PLLC

(57) ABSTRACT

A waterwave simulation method and apparatus, an electronic device, and a storage medium are provided. The method includes: in response to detecting that waterwaves need to be acquired during simulation on an initial model, acquiring one or more target regions corresponding to the waterwaves and one or more slots (11) corresponding to the one or more target regions; and obtaining a target model by attaching the one or more slots to the initial model, where an effect of waterwaves (12) is present in the one or more target regions of the target model. In the method, the target model can involve waterwaves by attaching the one or more slots with waterwaves to the initial model, and it is only necessary to allocate an internal memory and a display memory for the one or more slots without adding extra internal memory and display memory, which is beneficial to improve simulation efficiency.

9 Claims, 7 Drawing Sheets

(51) Int. Cl.
G06T 15/04 (2011.01)
G06T 17/20 (2006.01)

(56) References Cited

U.S. PATENT DOCUMENTS

2019/0370987 A1    12/2019  Shi et al.
2022/0284651 A1*   9/2022   Khitrin .................. A63F 13/57
2022/0292734 A1*   9/2022   Wang ..................... G06T 11/00

OTHER PUBLICATIONS

Chen Jiansong et al. "A Terrain-based 3D Scene Rendering Algorithm." Computer Engineering and Application, Mar. 11, 2006, 1002-8331-(2006) 08-0031-03.

* cited by examiner (a)

(b)

(c)

WATERWAVE SIMULATION METHODS AND APPARATUSES, ELECTRONIC DEVICES, AND STORAGE MEDIA

CROSS-REFERENCE TO RELATED APPLICATIONS

This application is a national stage of international PCT Application No. PCT/CN2021/120898 filed on Sep. 27, 2021, the entire contents of which are incorporated herein by reference.

TECHNICAL FIELD

The present disclosure relates to the field of data processing technology, and in particular, to waterwave simulation methods and apparatuses, electronic devices, and storage media.

BACKGROUND

Currently, during creation of a model, waterwaves need to be formed in some regions (such as regions involving rivers and lakes) of the model. In the related art, waterwaves formed in a 3D simulation process are usually stereoscopic waterwaves, so that dedicated space needs to be allocated to process the waterwaves, and extra internal memory and display memory are required to process the display of simulated waterwaves.

SUMMARY

The present disclosure provides waterwave simulation methods and apparatuses, electronic devices, and storage media to solve deficiencies in the related art.

According to a first aspect of embodiments of the present disclosure, there is provided a waterwave simulation method, including:
  in response to detecting that waterwaves need to be acquired during simulation on an initial model, acquiring one or more target regions corresponding to the waterwaves and one or more slots corresponding to the one or more target regions; and
  obtaining a target model by attaching the one or more slots to the initial model, where an effect of waterwaves is present in the one or more target regions of the target model.

Optionally, acquiring the one or more slots corresponding to the one or more target regions includes:
  obtaining one or more first images by acquiring and processing one or more bitmap images; and
  obtaining one or more second images by processing the one or more first images, where the one or more second images are used as the one or more slots corresponding to the one or more target regions.

Optionally, obtaining the one or more first images by processing the one or more bitmap images includes:
  for each of the one or more bitmap images, acquiring a target point in the bitmap image and a normal corresponding to the target point, where the normal is a straight line passing through the target point and parallel to a z-axis in a bitmap image coordinate system;
  acquiring transformation data of pixels around the target point with the normal corresponding to the target point as reference and in conjunction with a preset angle in noise data, and determining to-be-processed pixels according to the target point;
  determining a transformation matrix corresponding to the bitmap image according to the transformation data and the to-be-processed pixels; and
  obtaining the one or more first images by adjusting the one or more bitmap images according to respective transformation matrices.

Optionally, acquiring the target point in the bitmap image includes:
  acquiring a mapping point and a center point of the bitmap image, where the mapping point indicates a corresponding start point obtained by mapping a coordinate origin of the bitmap image coordinate system to a world coordinate system;
  acquiring a midpoint of a line between the mapping point and the center point to obtain a first midpoint;
  in response to detecting that the first midpoint is located within the bitmap image, determining the first midpoint as the target point;
  in response to detecting that the first midpoint is located outside the bitmap image, acquiring a midpoint of a line between a preset point and the center point of the bitmap image to obtain a second midpoint; and
  determining the second midpoint as the target point.

Optionally, determining the to-be-processed pixels according to the target point includes:
  acquiring candidate pixels that satisfy a first screening condition in the bitmap image, where the first screening condition includes at least one of: for pixel values of a candidate pixel, a red pixel value is less than or equal to a red pixel threshold, a green pixel value exceeds a green pixel threshold, and a blue pixel value exceeds a first blue pixel threshold and a second blue pixel threshold, where the second blue pixel threshold is greater than the first blue pixel threshold;
  determining a spacing distance between two adjacent pixels in the bitmap image according to a size of the bitmap image and a size of a display region of a display screen; and
  in response to determining that a second screening condition is not satisfied, repeatedly executing a step of, with a specified point as a start point, moving the specified point by the spacing distance in different directions in sequence until pixels at corresponding positions are non-candidate pixels or the corresponding positions exceed a boundary of the bitmap image, and determining candidate pixels at the corresponding positions as the to-be-processed pixels, where the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

According to a second aspect of embodiments of the present disclosure, there is provided a waterwave simulation apparatus, including:
  a target region acquisition module, configured to, in response to detecting that waterwaves need to be acquired during simulation on an initial model, acquire one or more target regions corresponding to the waterwaves, and one or more slots corresponding to the one or more target regions;
  a target model acquisition module, configured to obtain a target model by attaching the one or more slots to the initial model, where an effect of waterwaves is present in the one or more target regions of the target model.

Optionally, the target region acquisition module includes:

a first image acquisition module, configured to obtain one or more first images by acquiring and processing one or more bitmap images; and a second image acquisition module, configured to obtain one or more second images by processing the one or more first images, where the one or more second images are used as the one or more slots corresponding to the one or more target regions.

Optionally, the first image acquisition module includes:

a target point acquisition sub-module, configured to for each of the one or more bitmap images, acquire a target point in the bitmap image and a normal corresponding to the target point, where the normal is a straight line passing through the target point and parallel to a z-axis in a bitmap image coordinate system;

a transformation data acquisition sub-module, configured to acquire transformation data of pixels around the target point with the normal corresponding to the target point as reference and in conjunction with a preset angle in noise data, and determine to-be-processed pixels according to the target point;

a transformation matrix acquisition sub-module, configured to determine a transformation matrix corresponding to the bitmap image according to the transformation data and the to-be-processed pixels; and a first image acquisition sub-module, configured to obtain the one or more first images by adjusting the one or more bitmap images according to respective transformation matrices.

Optionally, the target point acquisition sub-module includes:

a center point acquisition unit, configured to acquire a mapping point and a center point of the bitmap image, where the mapping point indicates a corresponding start point obtained by mapping a coordinate origin of the bitmap image coordinate system to a world coordinate system;

a first midpoint acquisition unit, configured to acquire a midpoint of a line between the mapping point and the center point to obtain a first midpoint;

a target point acquisition unit, configured to, in response to detecting that the first midpoint is located within the bitmap image, determine the first midpoint as the target point;

a second midpoint acquisition unit, configured to, in response to detecting that the first midpoint is located outside the bitmap image, acquire a midpoint of a line between a preset point and the center point of the bitmap image to obtain a second midpoint; and a target point acquisition unit, configured to determine the second midpoint as the target point.

Optionally, the transformation data acquisition sub-module includes:

a candidate pixel acquisition unit, configured to acquire candidate pixels that satisfy a first screening condition in the bitmap image, where the first screening condition includes at least one of for pixel values of a candidate pixel, a red pixel value is less than or equal to a red pixel threshold, a green pixel value exceeds a green pixel threshold, and a blue pixel value exceeds a first blue pixel threshold and a second blue pixel threshold, where the second blue pixel threshold is greater than the first blue pixel threshold;

a spacing distance acquisition unit, configured to determine a spacing distance between two adjacent pixels in the bitmap image according to a size of the bitmap image and a size of a display region of a display screen; and a to-be-processed pixel acquisition unit, configured to, in response to determining that the second screening condition is not satisfied, repeatedly execute a step of, with a specified point as a start point, moving the specified point by the spacing distance in different directions in sequence until pixels at corresponding positions are non-candidate pixels or the corresponding positions exceed to a boundary of the bitmap image, and determine candidate pixels at corresponding positions as the to-be-processed pixels, where the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

According to a third aspect of embodiments of the present disclosure, there is provided an electronic device, including:

a processor;

a memory for storing a computer program executable by the processor;

where the processor is configured to execute the computer program in the memory to implement the methods as described above.

According to a fourth aspect of embodiments of the present disclosure, there is provided a non-volatile computer readable storage medium, where an executable computer program in the storage medium is executed by a processor to implement the methods as described above.

The technical solutions provided by the embodiments of the present disclosure can achieve the following beneficial effects:

As can be known from the above embodiments, in the technical solutions provided by the present disclosure, in response to detecting that waterwaves need to be acquired during simulation on an initial model, one or more target regions corresponding to the waterwaves, and one or more slots corresponding to the one or more target regions can be acquired; and then a target model is obtained by attaching the one or more slots to the initial model, where an effect of waterwaves is present in the one or more target regions of the target model. In this way, in the embodiments, the target model can involve waterwaves by attaching the one or more slots with waterwaves to the initial model, and it is only necessary to allocate an internal memory and a display memory for the one or more slots without adding extra internal memory and display memory, which is beneficial to improve a simulation efficiency.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
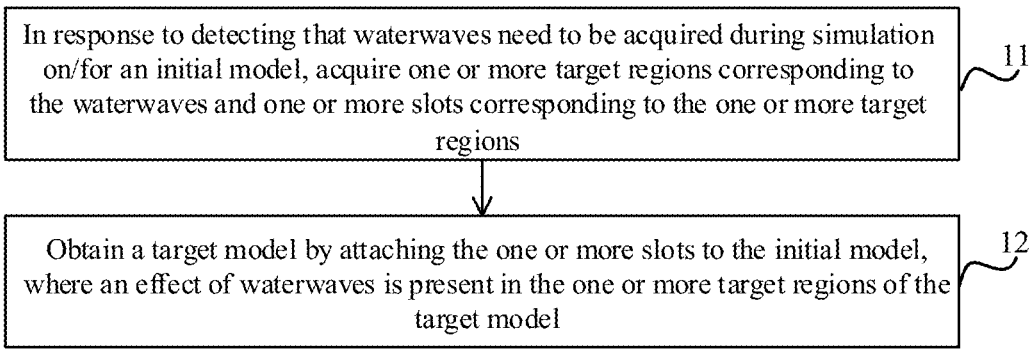
FIG. 1 is a flowchart illustrating a waterwave simulation method according to an exemplary embodiment.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 2:
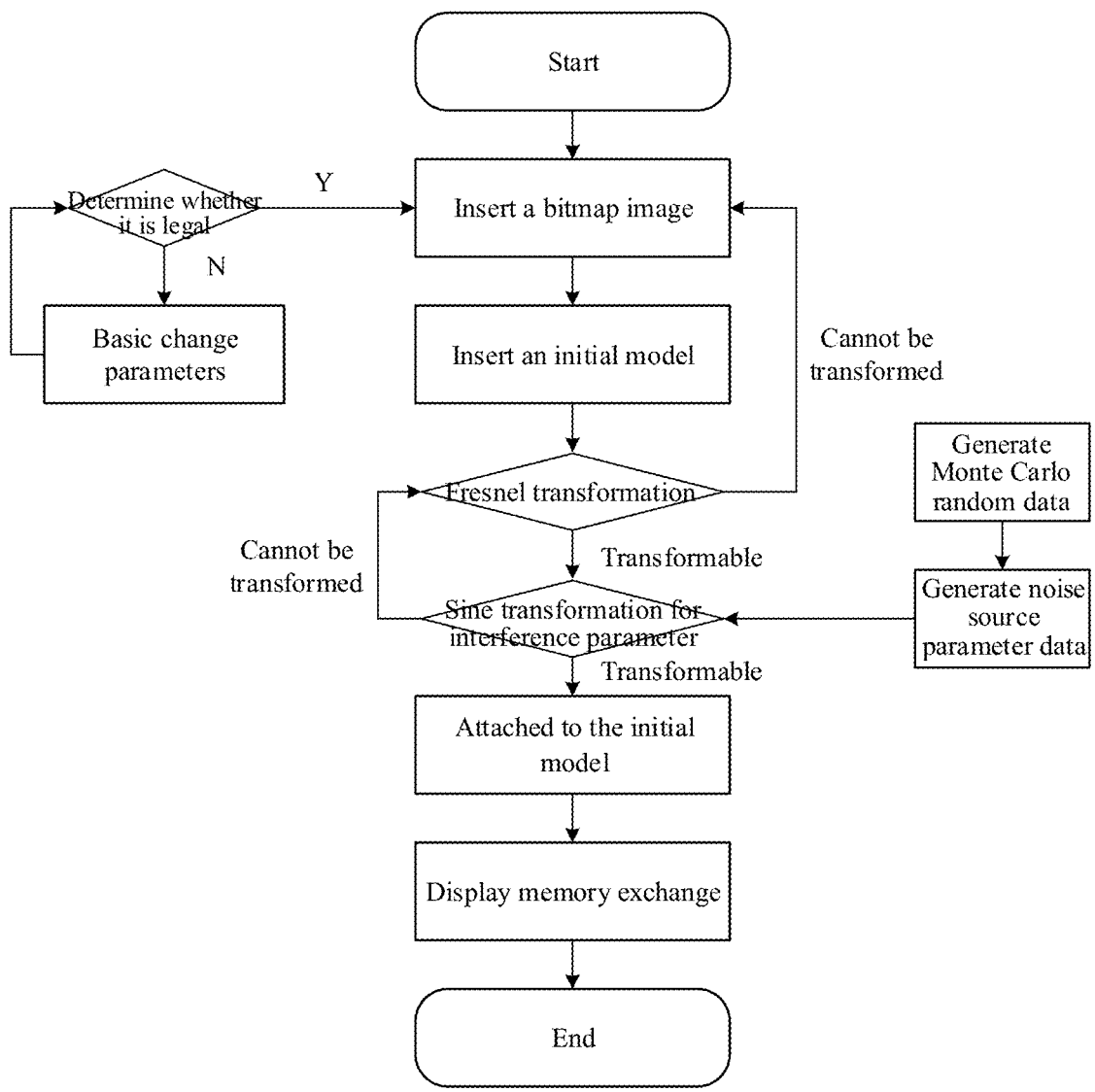
FIG. 2 is a flowchart illustrating another waterwave simulation method according to an exemplary embodiment.

To solve the above technical problem, an embodiment of the present disclosure provides a waterwave simulation method, which can be applied to an electronic device, such as a smart phone, a tablet computer, a personal computer, or a server. FIG. 1 is a flowchart illustrating a waterwave simulation method according to an exemplary embodiment of the present disclosure. FIG. 2 is a detailed flowchart illustrating a waterwave simulation method according to an exemplary embodiment of the present disclosure. Referring to FIGS. 1 and 2, a waterwave simulation method includes steps 11 to 12.

At step 11, in response to detecting that waterwaves need to be acquired during simulation on/for an initial model, one or more target regions corresponding to the waterwaves and one or more slots corresponding to the one or more target regions are acquired.

In the embodiments, the electronic device may acquire an initial model, such as a 3D model. In practical applications, the electronic device may be equipped with an interactive graphics program, such as OpenSceneGraph (OSG) engine, and during working of the OSG engine, the electronic device may create an air vehicle, a game, virtual reality, an architectural model, or other 3D model according to user operations. Moreover, some regions of the 3D model involve waters, such as rivers, lakes, oceans, ports, or fountains.

In the embodiments, the electronic device may performing simulation on the initial model in response to a user request for simulation, and a whole process of changes in parameters of the model may be observed through experiments to study effects of different parameters on the initial model. In a process that a user starts the initial model for performing simulation thereon, the electronic device may read the initial model from a local memory, specifically, load node data of each node in sequence according to an order of nodes in the initial model.

In the embodiments, during simulation, the electronic device may display an interactive interface, and the interactive interface may include a menu bar, which includes slots in various waterwave formats. A user may select one of the slots from the menu bar as a slot corresponding to a target region with reference to actual requirements for an initial model and/or user needs. It should be noted that the initial model may include multiple target regions, and each target region corresponds to one slot. Considering that methods for processing the slots are same, in subsequent embodiments, solutions will be described by taking an example of attaching a slot to a target region, so as to facilitate description and understanding.

In the embodiments, the electronic device may acquire one or more target regions corresponding to waterwaves in response to detecting that the waterwaves need to be acquired. In practical applications, there are one or more "hollowed" regions in an initial model, and some bitmap images need to be inserted into the one or more "hollowed" regions respectively to obtain a desired effect. In the embodiments, the one or more "hollowed" regions may be used as the one or more target regions corresponding to the waterwaves.

In the embodiments, the electronic device may be provided with a local database, and the database may store bitmap images, including, but not limited to, bitmaps in a format of jpg, png, bitmap, etc. The database may store pixel matrices parsed from the bitmap images or, related data of the bitmap images, for example, dynamic link library dll files or static link library lib files. When the electronic device reads nodes involving waters in the initial model, the electronic device may read the bitmap images from the local database. In this case, the electronic device may determine that waterwaves need to be acquired during simulation on the initial model. The electronic device may read the bitmap images from the local database, and insert one or more bitmap images corresponding to one or more target regions into the one or more target regions.

It should be noted that, in the embodiments, before a bitmap image is inserted, the electronic device may determine whether changes in specified parameters of the initial model are legal, for example, whether a normal angle is between 0 and 180 degrees, or whether a sine value is between 0 and 1 or whether ranges of waterwaves extend to a boundary of the bitmap image. The specified parameters are selected according to particular scenes, which is not limited here.

Figure 3:
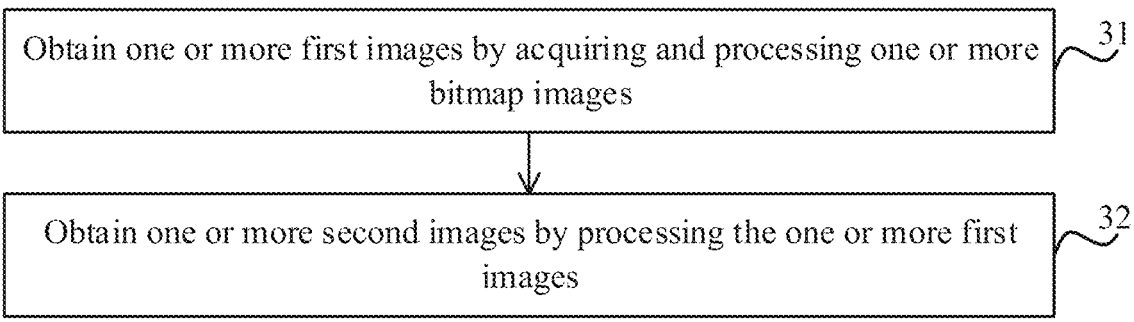
FIG. 3 is a flowchart of acquiring one or more slots according to an exemplary embodiment.

In the embodiments, the electronic device may be provided with a local database, and the database may store bitmap images, including, but not limited to, bitmaps in a format of jpg, png, bitmap, etc. The database may store pixel matrices parsed from the bitmap images or, related data of the bitmap images, for example, dynamic link library dll files or static link library lib files. When the electronic device reads nodes involving waters in the initial model or a user selects a slot for a target region, the electronic device may read the bitmap images from the local database. In this case, the electronic device may determine that waterwaves need to be acquired during simulation on the initial model. The electronic device may acquire one or more slots corresponding to one or more target regions, which, referring to FIG. 3, includes steps 31 and 32.

Figure 4:
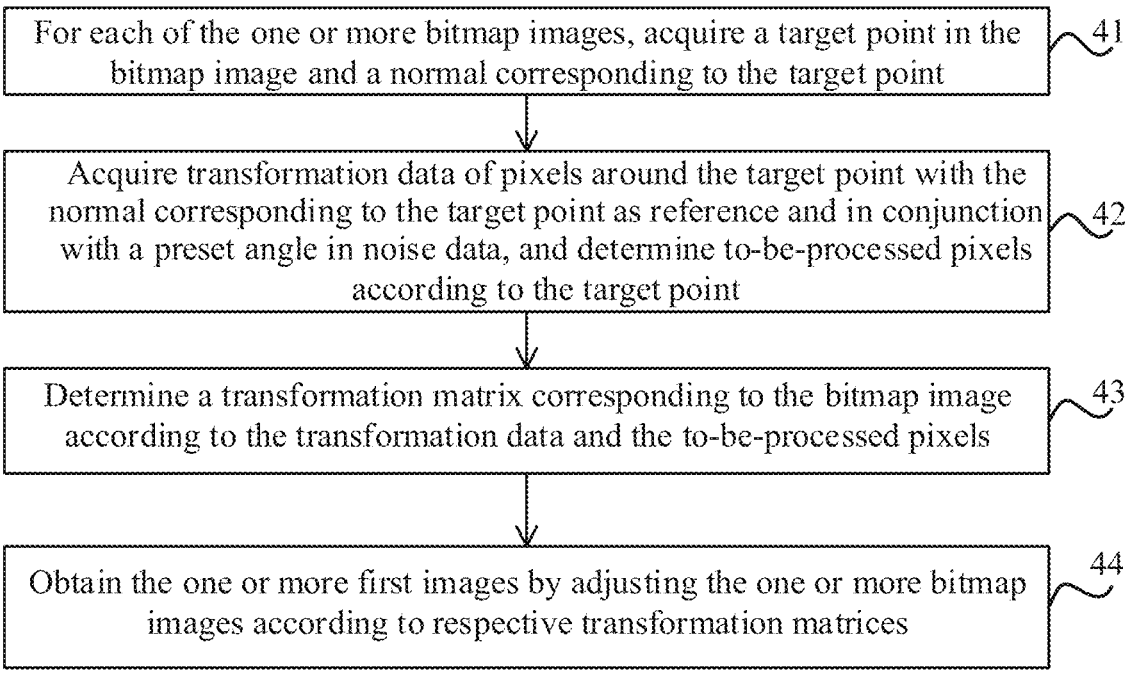
FIG. 4 is a flowchart of acquiring one or more first images according to an exemplary embodiment.

At step 31, the electronic device may obtain one or more first images by acquiring and processing one or more bitmap images, which, referring to FIG. 4, includes steps 41 to 44.

Figure 5:
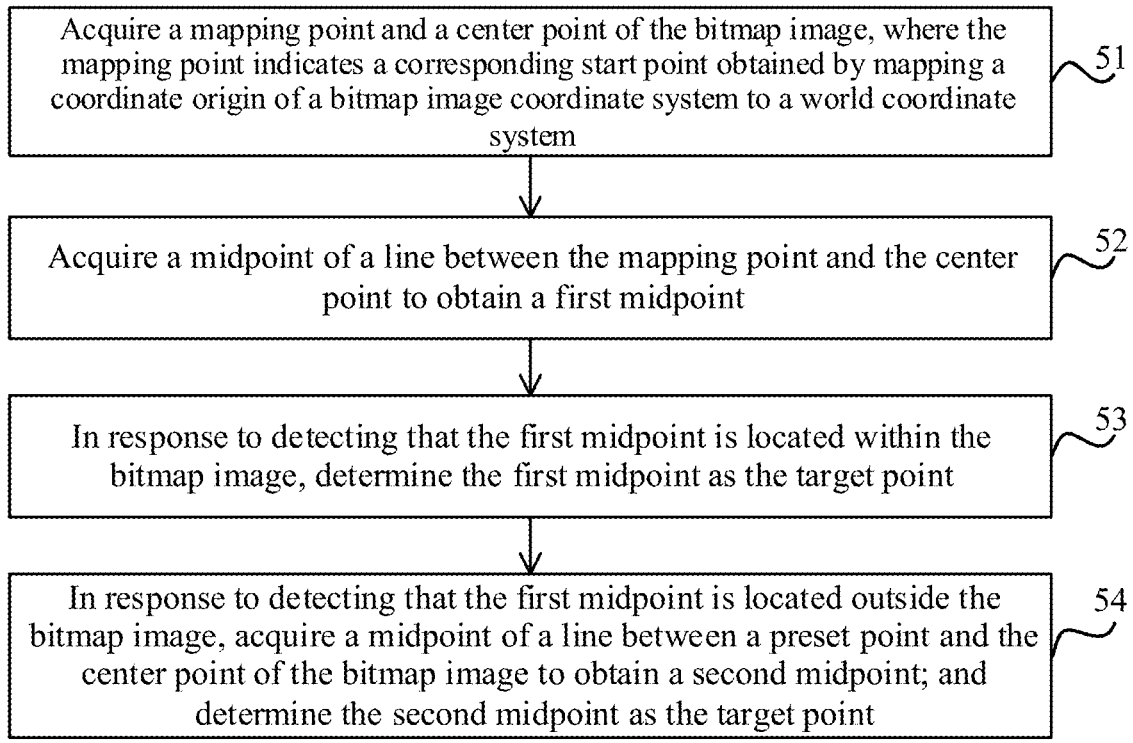
FIG. 5 is a flowchart of acquiring a target point according to an exemplary embodiment.
Figure 6:
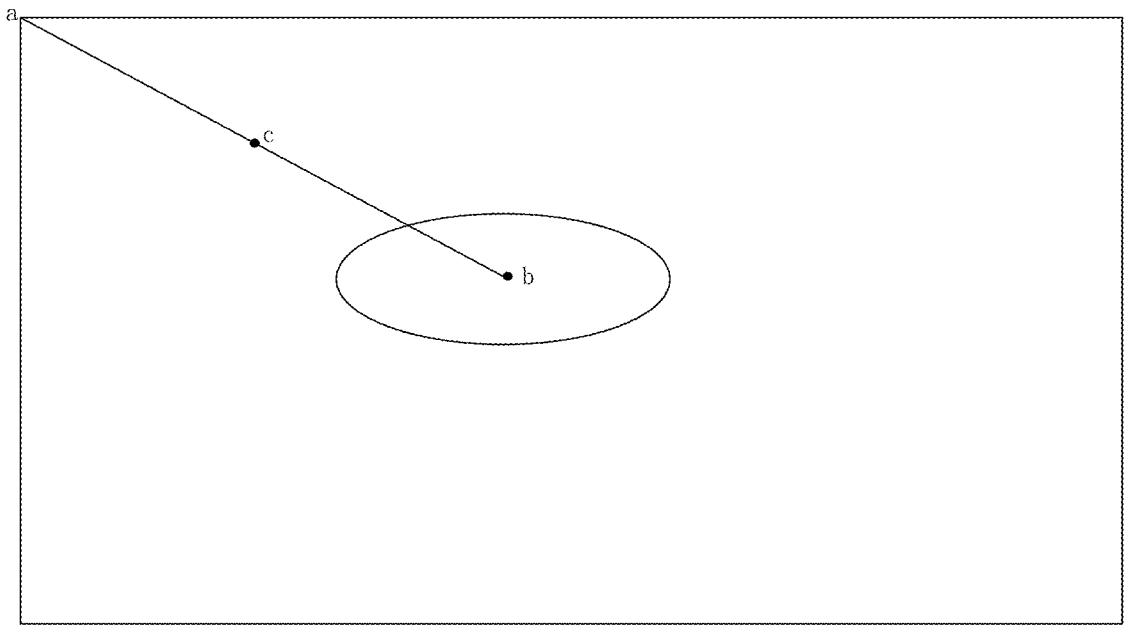
FIG. 6 is a schematic diagram illustrating an effect of a situation in which a first midpoint is located outside a bitmap image according to an exemplary embodiment.
Figure 7:
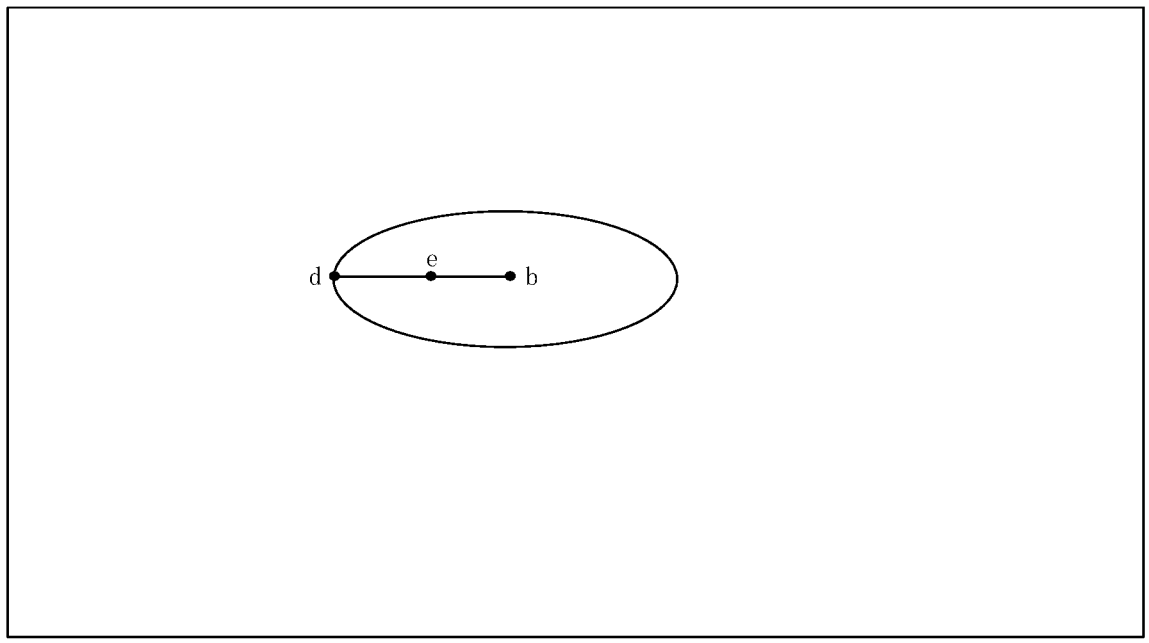
FIG. 7 is a schematic diagram illustrating an effect of a situation in which a second midpoint is located within a bitmap image according to an exemplary embodiment.

At step 41, for each of the one or more bitmap images, the electronic device may acquire a target point in the bitmap image and a normal corresponding to the target point. The target point may be understood as a reference point for processing the bitmap image. Referring to FIG. 5, an acquisition method includes steps 51 to 54: at step 51, the electronic device may acquire a mapping point and a center point of the bitmap image, where the mapping point indicates a corresponding start point obtained by mapping a coordinate origin of a bitmap image coordinate system to a world coordinate system. At step 52, the electronic device may acquire a midpoint of a line between the mapping point and the center point to obtain a first midpoint. At step 53, in response to detecting that the first midpoint is located within the bitmap image, the electronic device may determine the first midpoint as the target point. At step 54, in response to detecting that the first midpoint is located outside the bitmap image, for example, as shown in FIG. 6, midpoint c of a line between mapping point a and center point b of the bitmap image, i.e., first midpoint c, is located outside the bitmap image, the electronic device may acquire a midpoint of a line between a preset point (for example, a corner point of the bitmap image whose shape is rectangular) and the center point of the bitmap image to obtain a second midpoint, where the second midpoint falls within the bitmap image, for example, as shown in FIG. 7, midpoint e of a line between preset point d and center point b of the bitmap image, i.e., second midpoint e, is located within the bitmap image. In this case, the electronic device may determine the second midpoint as the target point. In these steps, the reference point for processing the bitmap image can be acquired by acquiring the target point, so as to ensure that waterwaves are located within the bitmap image and improve processing efficiency.

Figure 8:
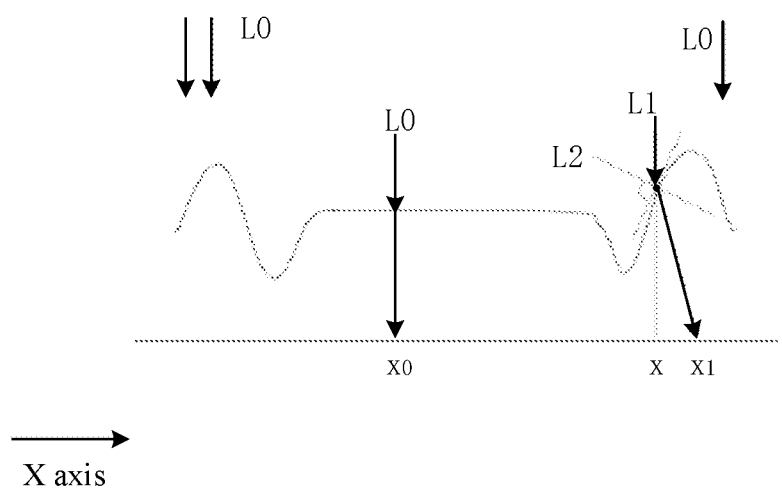
FIG. 8 is a schematic diagram illustrating a data logic principle according to an exemplary embodiment.

In the embodiments, the normal of the target point is a straight line passing through the target point and parallel to a z-axis in the bitmap image coordinate system. Referring to FIG. 8, a bottom line represents a background plane; a curve containing two sine waves above the background plane represents a water surface, where the sine waves represent waterwaves; and vertical lines perpendicular to the background plane above the water surface represent lines of sight from a user when viewing the water surface. Taking a target point at x0 as an example, the water surface is a plane, and a normal of the water surface is perpendicular to the background plane. A line of sight L0 is parallel to the normal at x0. The line of sight may pass through the water surface and be perpendicular to the background plane. Taking a target point at x as an example, there is a waterwave on the water surface, and the normal, which now becomes L2, is no longer perpendicular to the background plane, that is, an angle is kept therebetween. The line of sight may arrive at x1 through refraction of the waterwave. Based on the above principle, when the water surface includes multiple waterwaves, by adjusting a direction of lines of sight, lines of sight from a user can be unevenly distributed on the background plane to achieve an effect of viewing waterwaves.

Based on the effect shown in FIG. 8, it can be known that the normal of the target point is parallel to the z-axis in the bitmap image coordinate system regardless of whether the target point is at the plane or waterwave of the water surface.

At step 42, the electronic device may acquire transformation data of pixels around the target point with the normal corresponding to the target point as reference and in conjunction with a preset angle in noise data, and determine to-be-processed pixels according to the target point. It can be understood that the transformation data refers to data required to adjust pixel values of the pixels around the target point to form waterwaves, and the transformation data is associated with the preset angle and direction vectors, where the direction vectors characterize directions between the to-be-processed pixels and the target point, that is, unit vectors formed when viewing from the target point to the to-be-processed pixels, such as (0, 1), (1, −1), (0, −1), (−1, −1), (−1, 0), (−1, 1), (0, 1) and (1, 1). The preset angle refers to an angle formed by a slot (i.e., bitmap image) coordinate system and an initial model coordinate system (i.e., world coordinate system) when the slot coordinate system is mapped to the initial model coordinate system, where the angle will change with the initial model coordinate system, that is, when a user rotates the model to adjust viewing angles, an insertion angle of the slot, that is, the preset angle, will change synchronously. It can be understood that mapping relationship between the slot coordinate system and the world coordinate system can be preset or extracted from an application for generating the model.

Figure 9:
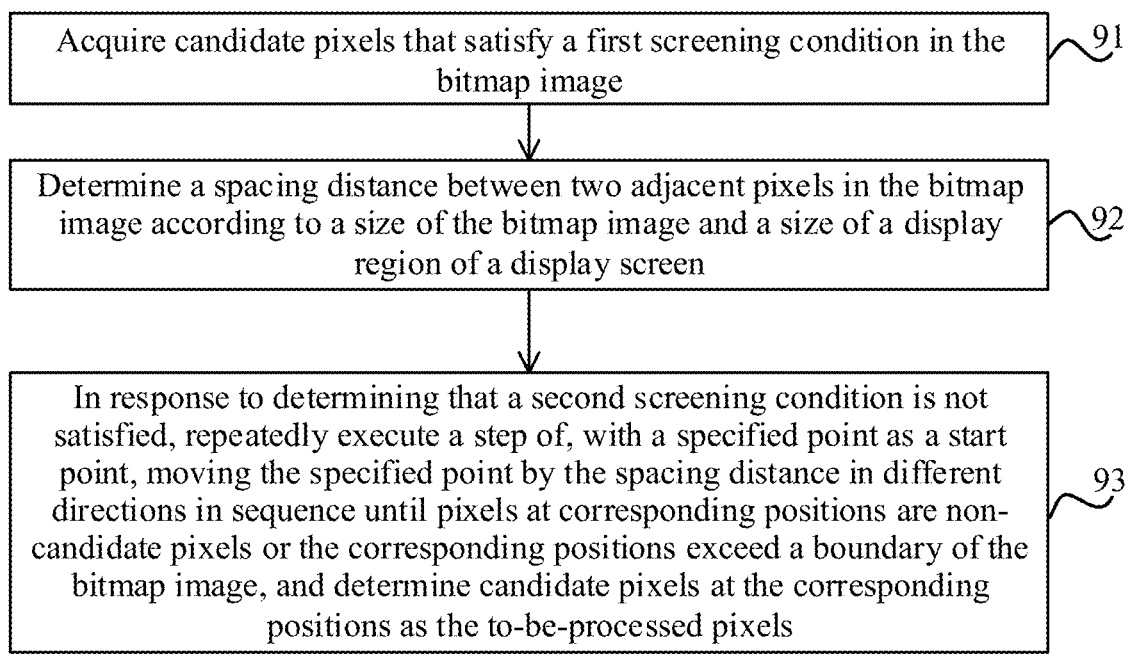
FIG. 9 is a flowchart of acquiring to-be-processed pixels according to an exemplary embodiment.

In this step, the electronic device may determine the to-be-processed pixels according to the target point, which, referring to FIG. 9, includes steps 91 to 93.

Figure 10:
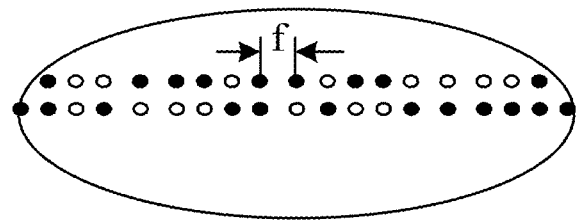
FIG. 10 is a schematic diagram illustrating an effect of acquiring a spacing distance according to an exemplary embodiment.

At step 91, the electronic device may acquire candidate pixels that satisfy a first screening condition in the bitmap image. As shown in FIG. 10, black dots in FIG. 10 represent the candidate pixels that satisfy the first screening condition, and circles represent non-candidate pixels that do not satisfy the first screening condition. The first screening condition includes at least one of: for pixel values of a candidate pixel, a red pixel value is less than or equal to a red pixel threshold; a green pixel value exceeds a green pixel threshold, and a blue pixel value exceeds a first blue pixel threshold and a second blue pixel threshold, where the second blue pixel threshold is greater than the first blue pixel threshold. In this step, by setting the first screening condition, it can be ensured that water color tends toward blue or green instead of red, which is beneficial to improve a simulation effect.

At step 92, the electronic device may determine a spacing distance between two adjacent pixels in the bitmap image according to a size of the bitmap image and a size of a display region of a display screen, for example, distance f as shown in FIG. 10. The initial model or a subsequent target model needs to be displayed in the display region of the display screen, so that the size of the display region will affect the spacing distance between adjacent pixels in the bitmap image. After the size of the display region is determined, a size of a target region can be determined synchronously, and since a resolution of the bitmap image is known, the spacing distance between two adjacent pixels in the bitmap image can be determined. By setting the spacing distance, spacing between two waterwaves can be maintained, which ensures the same effect as waterwaves in real life, and improves viewing experience.

It should be noted that the description in step 92 is a solution of determining the spacing distance by using the size of the bitmap image and the size of the display region of the display screen. In practical applications, the spacing distance may be set according to empirical values, for example, the spacing distance is set to 3-5 pixels when there is a light wind blowing, and to 10-15 pixels when there is a strong wind blowing, which can also implement the solutions of the present disclosure.

At step 93, in response to determining that a second screening condition is not satisfied, the electronic device may repeatedly execute a step of, with a specified point as a start point, moving the specified point by the spacing distance in different directions in sequence until pixels at corresponding positions are non-candidate pixels or the corresponding positions exceed a boundary of the bitmap image, and determine candidate pixels at the corresponding positions as the to-be-processed pixels, where the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

Step 93 may be an iterative step. That is, first, a target point, which serves as reference, can be understood as a position where a stone falls, for which, referring to FIG. 8, x0 is a target point. Then, candidate pixels spaced apart from the target point by a spacing distance are to-be-processed pixels, for example, a pixel at x on a right side is a to-be-processed pixel, and after the to-be-processed pixels are processed, a first strip of waterwave or a first circle of waterwave (i.e., a crest of a wave) can be acquired. Next, after the target point is moved in different directions by the spacing distance, candidate pixels corresponding to locations of the moved target point are used as to-be-processed pixels, and after the to-be-processed pixels are processed, a second strip of waterwave or a second circle of waterwave can be acquired; and so on in an order of "waterwave-normal-waterwave-normal . . . " until the target point is moved to or beyond a boundary of the bitmap image.

Figure 11:
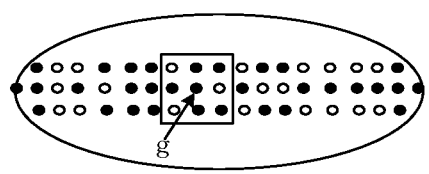
FIGS. 11 (a) to 11 (c) are schematic diagrams illustrating an effect of acquiring to-be-processed pixels according to an exemplary embodiment.
Figure 11:
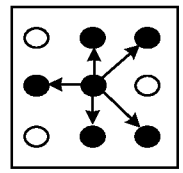
Figure 11:
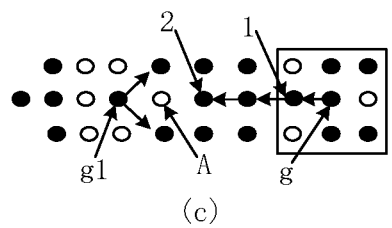

In practical applications, considering that the first time a waterwave is extended in 8 directions of a target point, with reference to FIGS. 11 (*a*) to 11 (*c*), in which, FIG. 11 (*a*) shows a target point g and FIG. 11 (*b*) shows that a waterwave is extended in 5 directions that satisfy requirements, for each direction, to-be-processed pixels are adjusted to acquire the waterwave according to the method in step 93, subsequent extension is continued in the same directions, and if candidate pixels are encountered, pixel brightness will be adjusted to form waterwaves. FIG. 11 (*c*) shows an effect of moving the target point leftwards three times to form waterwave 1 and waterwave 2. After the target point is moved by the spacing distance, when a corresponding pixel at the location of the moved target point is not candidate pixel (such as pixel A), extension with target point g as reference is stopped. Then, extension in all directions is continued to search for candidate pixels, and each of the found candidate pixels will be used as a specified point to continue extension in 8 directions. For example, as shown in FIG. 11 (*c*), which shows an effect of finding specified point g1 on a left side, specified point g1 turns into a reference point having the same status as a target point, and subsequent extension based on the specified point is the same as that based on the target point, which will not be repeated here. Based on the principle shown in FIGS. 11 (*a*) to 11 (*c*), search of specified points and extension of waterwaves will be continued until the waterwaves are extended to the boundary or there is no candidate pixel. In this way, waters can be covered with waterwaves through the above extension method.

It should be noted that extending waterwaves in 8 directions with a specified point as reference is suitable for scenes where stones or raindrops fall into waters, and here circles of waterwaves with the specified point as a circle center will be formed. Considering that waters such as lakes or oceans have a larger area and their waterwaves move toward shores, the waterwaves can be extended in four directions from the specified point to the shores, and the same is true for specified points that appear subsequently. In this way, waterwaves that move continuously toward the shores are formed, and the waterwaves match simulation scenes. Person of ordinary skill in the art may select appropriate direction vectors according to particular scenes to ensure flow directions and orientations of waterwaves. The flow directions refer to directions in which the waterwaves move. For example, waterwaves in oceans flow from deep within the oceans to shores. The orientations refer to orientations in which the waterwaves are displayed to a user, that is, angles of waterwaves viewed by the user in different angles of view. For example, a waterwave is viewed from its front, and after a model is rotated by 90 degrees (which can be understood as a change in the preset angle being 90 degrees), a mountain-shaped waterwave with a high middle and two low sides is viewed from its sides.

It should be noted that, considering that a proportion of to-be-processed pixels that satisfy requirements in a bitmap image is nearly half or less than half, that is, less than or equal to 50%, such as 30%, for the whole bitmap image, an average distance between two adjacent specified points is about 2-3 pixels, so that, for each specified point, extension cannot be continued after a first strip of waterwave or a first circle of waterwave is formed, and as a whole, multiple strips of waterwaves or multiple circles of waterwaves can be formed in the whole bitmap image, so that an effect of forming waterwaves in the bitmap image is achieved. That is to say, in the embodiments, with the above-described spacing distance and spacing distances between pixels that do not satisfy requirements combined, final spacing between two adjacent waterwaves can be ensured to achieve a final effect of visually viewing two waterwaves or two waterwaves with large spacing. At step 43, the electronic device may determine a transformation matrix corresponding to the bitmap image according to the transformation data and the to-be-processed pixels.

In this step, considering that differences between different waterwaves in the bitmap image lie merely in: changes in direction vectors, or, different orientations of different to-be-processed pixels to a target point, therefore, for different waterwaves, preset angles associated with transformation data for to-be-processed pixels remains unchanged, and direction vectors are changed separately as a variable.

Thus, the electronic device can determine direction vectors for to-be-processed pixels. With reference to contents exemplified in step 42, the direction vectors are related to a scene where waters are located and a preset angle (such as to which direction the preset angles point). The scene where waters are located decides that waterwaves are extended in 1, 4 or 8 directions, so that there are direction vectors in 1, 4 or 8 directions for a specified point, and further decides which direction vector is used for to-be-processed pixel in each direction associated with the specified point. The preset angle decides propagation directions of waterwaves, and thereby decides which direction vectors are selected for to-be-processed pixels to use. For example, when a preset angle is 0 degree, a waterwave can be viewed from its front, and in this case, a direction vector pointing to the left or right can be selected for to-be-processed pixels; when a model is rotated by 90 degrees, that is, a change in the preset angle is 90 degrees, a mountain-shaped waterwave can be viewed from its sides, and in this case, a direction vector pointing to or away from a display screen can be selected for to-be-processed pixels. It should be noted that, for the purpose of vivid description, a process of selecting direction vectors is illustrated from perspective of a user viewing the display screen. In practical applications, transformation can be performed according to mapping relationships between a world coordinate system and a bitmap image coordinate system.

Then, the electronic device may write direction vectors for each to-be-processed pixel and the preset angle into a transformation matrix, and write constant 1 (indicating no need to change) at positions of pixels other than to-be-processed pixels, so as to finally determine a transformation matrix corresponding to the bitmap image.

At step 44, the electronic device may obtain the one or more first images by adjusting the one or more bitmap images according to respective transformation matrices. It can be understood that the electronic device acquires a product of pixels in the bitmap image and transformation data in the transformation matrix according to their corresponding relationships, that is, updates pixel values of to-be-processed pixels in the bitmap image, so as to obtain a first image.

In the embodiments, the transformation matrix can be used to indicate at which positions pixels are adjusted to form waterwaves. Adjusting the pixel values in this step is substantially to adjust brightness values of pixels. High brightness is adopted for pixels at positions of waterwaves, and normal brightness is adopted for pixels at other positions. For pixel values that need to be adjusted in the bitmap image, brightness and contrast adjustments are grayscale linear transformation of the image. Please refer to the following formula:

$$y = [x - 127.5 * (1 - B)] * k + 127.5 * (1 + B),$$

where x is a pixel value before adjustment, and y is a pixel value after adjustment. B takes a value $[-1,1]$, and is used for adjusting brightness; k is used for adjusting contrast, arctan (k) takes a value $[1,89]$, and $k=\tan((45+44*c)/180*pi)$, where c takes a value of preset angle, and usually c is used to set contrast.

In an example, the electronic device may adjust brightness and contrast of pixels in the following methods:

When B=0, y=(x−127.5)*k+127.5; here only contrast is adjusted.

When c=0, k=1 and y=x+255*B; here only brightness is adjusted.

It should be noted that person of ordinary skill in the art can adjust brightness and contrast of pixels according to the above-described adjustment principle, which will not be repeated here.

At step 32, one or more second images are obtained by processing the one or more first images.

In an embodiment, the electronic device may process the first image to obtain a second image. For example, the electronic device may perform Fresnel transformation processing on the first image. Fresnel transformation can be understood as Fourier transformation, the purpose of which is to form any continuously measured time sequence or signal and use infinite superposition of sine wave signals with different frequencies. In this way, in this embodiment, waterwaves in an opposite direction (or backwash) appearing when waterwaves are extended in 8 directions based on subsequent reference points in step 93 can be found through the Fresnel transformation, where the backwash is noise signals with regard to waterwaves generated based on previous reference points, and then sine wave signals with a frequency corresponding to backwash signals are removed to obtain a second image. The solution in this embodiment is suitable for scenes where waters have a larger area and waterwaves flow in the same direction. For example, all waves in oceans flow toward shores. Accuracy of simulation of waterwaves can be ensured through anti-interference processing.

In an embodiment, the electronic device is provided with noise sources, and the noise sources may generate Monte Carlo random numbers and noise source parameter data, that is, the noise sources first generate the Monte Carlo random numbers, and then input the Monte Carlo random numbers into noise source parameters, thereby generating the noise source parameter data. The noise source parameter data may include different positions and incoming angles of the noise sources, which is similar to the solution in the embodiment shown in FIG. 6, where the noise sources may be equivalent to target points and the incoming angles are equivalent to preset angles, which is suitable for scenes such as waters when it is raining. Waterwaves generated by these noise sources may also interfere with waterwaves generated by the target points. In this embodiment, a sine transformation can be performed on a first image, so that waterwaves respectively corresponding to the target points and the noise sources can be superimposed to obtain a second image, and the second image can be used as a slot corresponding to a target region. In this embodiment, by superimposing noise data, an effect of superimposing different waterwaves can be simulated, and accuracy of waterwaves can be ensured.

At step 12, a target model is obtained by attaching the one or more slots to the initial model, where an effect of waterwaves is present in the one or more target regions of the target model.

Figure 12:
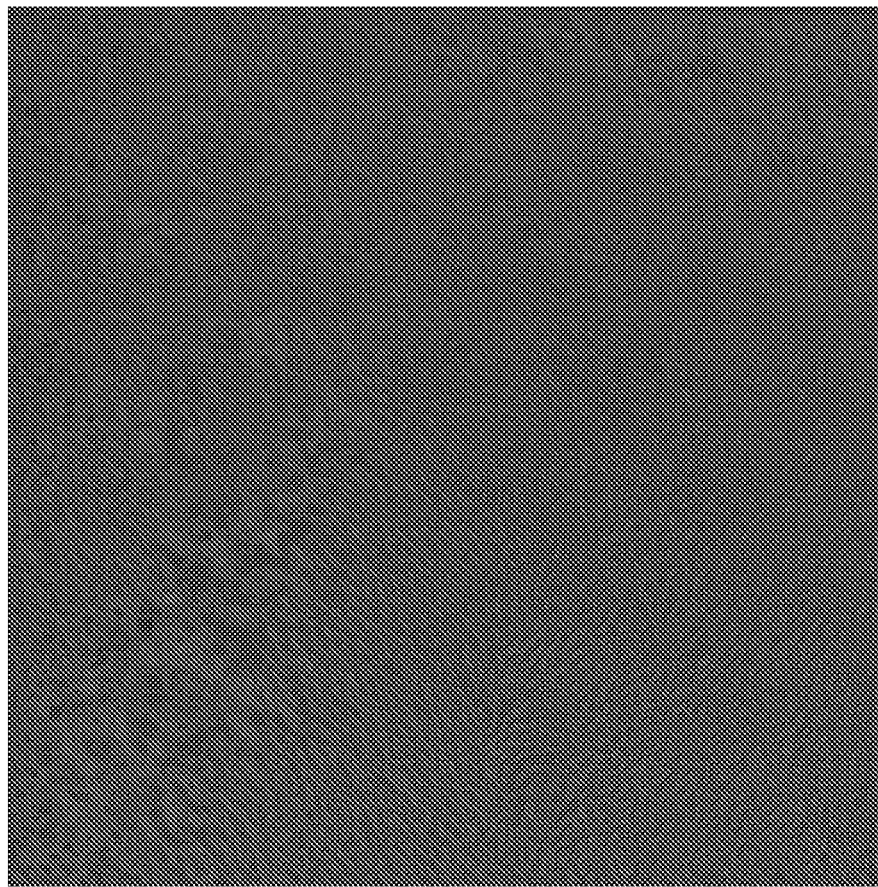
FIG. 12 is a schematic diagram illustrating an effect of a second image, i.e., a slot, according to an exemplary embodiment.

In the embodiments, the electronic device may attach the second image as a slot to the initial model to obtain the target model. The effect of waterwaves is shown in FIG. 12.

It should be noted that, processing in steps 11 to 12 is completed in an internal memory of the electronic device, so that in the process of acquiring slots, an internal memory region can be pre-allocated for a bitmap image, and updating pixel values in the bitmap image needs to be performed only on the bitmap image, so that waterwaves will not occupy space in a z-axis direction of the space, and different waterwaves can be formed only by adjusting loading angles; and there is no need to further allocate internal memory space, which can improve internal memory utilization.

In the embodiments, after acquiring the target model, the electronic device can exchange the target model in the internal memory into a display memory, and the display memory can complete rendering for the target model and other display tasks, which will not be described here. It can be understood that, for the display memory, no rendering parameters are added to the second image and the bitmap image, and therefore, using the above method in parts of the target model where waters are needed is beneficial to improve a simulation effect.

So far, in the technical solutions provided by the present disclosure, in response to detecting that waterwaves need to be acquired during simulation on an initial model, one or more target regions corresponding to the waterwaves, and one or more slots corresponding to the one or more target regions can be acquired; and then the one or more slots are attached to the initial model to obtain a target model, where an effect of waterwaves is present in the one or more target regions of the target model. In this way, in the embodiments, the target model can involve waterwaves by attaching the one or more slots with waterwaves to the initial model, and it is only necessary to allocate an internal memory and a display memory for one or more slots without adding extra internal memory and display memory, which is beneficial to improve a simulation efficiency.

Figure 13:
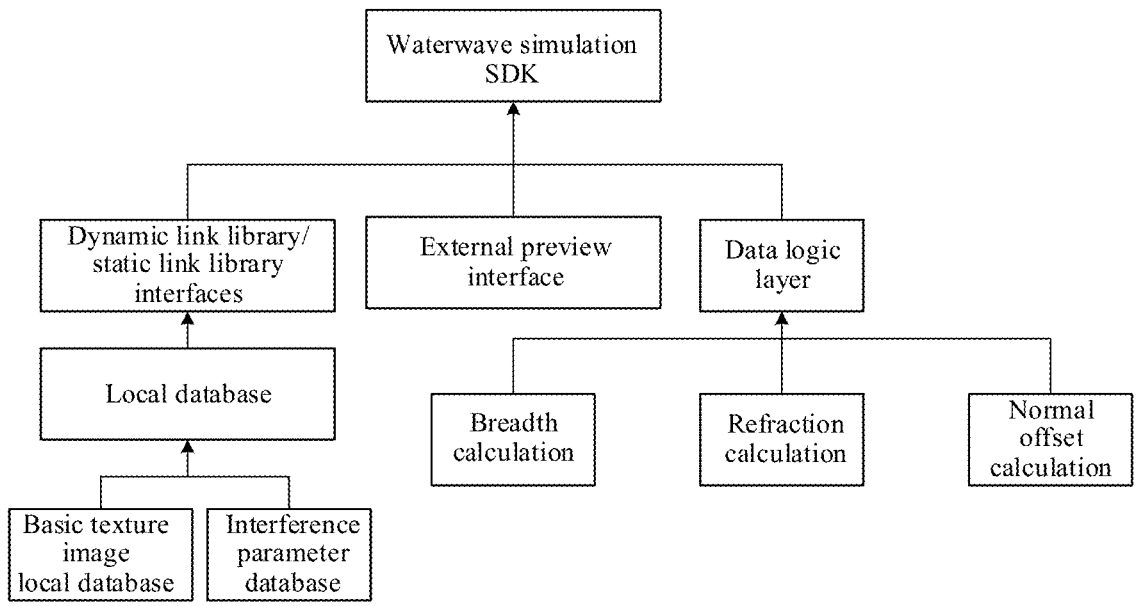
FIG. 13 is a schematic diagram illustrating a data logic principle according to an exemplary embodiment.

A process of implementing a waterwave simulation method according to an embodiment of the present disclosure will be described below with reference to FIG. 13.

A waterwave simulation SDK is stored in an electronic device, and the SDK can be called to run during simulation. The electronic device can retrieve a basic texture local database and an interference parameter database from a local database through dynamic link library or static link library interfaces. The basic texture database includes the bitmap images, and the interference parameter database includes the noise data. In practical applications, the steps shown in FIG. 1 can be integrated into a module, which provides only interfaces and static resource packages (for example, prefabricated basic texture images, or parameters such as heights and depths of waves, which can be set).

A user can select, from an interactive interface, one or more slots to be used for one or more target regions of an initial model. The electronic device, after detecting the one or more slots selected by the user, can acquire basic texture data and interference parameter data corresponding to the one or more slots. Then, the electronic device can call a breadth calculation model, a refraction calculation model and a normal offset calculation model through data logic layers to process the basic texture data and the interference parameter data. The schematic diagram illustrating a data logic principle is shown in FIG. 13. For example, the breadth calculation model can acquire respective start points and respective end points of one or more hollowed regions (or one or more target regions) in the initial model, and then determine a range of the one or more target regions in a display region. The refraction calculation model can acquire an angle at which one or more prefabricated basic texture images (i.e., one or more bitmap images) are placed in a 3D world, that is, a preset angle, and acquire an incoming angle of light or wind at scenes such as waters to determine flow directions and orientations of waterwaves. The normal offset calculation model can acquire coordinates of candidate pixels in the one or more basic texture images that satisfy requirements for pixels/RGB values (i.e., first screening condition), and acquire coordinates of specified points and their normals. It can be understood that when the preset angle does not change and the incoming angle of light or wind changes (that is, noise data changes), changes in normals at target points or specified points in the bitmap image can be caused, and changes in waterwaves can be further caused. Afterwards, the electronic device can acquire one or more slots after processing one or more basic texture images. Then, a target model can be obtained after the one or more slots are attached to the initial model. Finally, the target model can be displayed on an external preview interface.

It should be noted that the above contents describe a solution of inserting one or more slots into an OSG engine from an angle. In practical applications, an electronic device can load one or more slots directly at any position in the OSG engine, and here the loading angle can be adjusted (that is, when lines of sight remain unchanged, a preset angle can be adjusted by adjusting a direction to which a normal points) to form corresponding waterwaves in one or more target regions. Moreover, the loading angle will change with the change in spatial angel of a target model, so that flow directions and orientations of displayed waterwaves will change therewith, which achieves an effect of viewing waterwaves in different flow directions and orientations from different angles of view.

Figure 14:
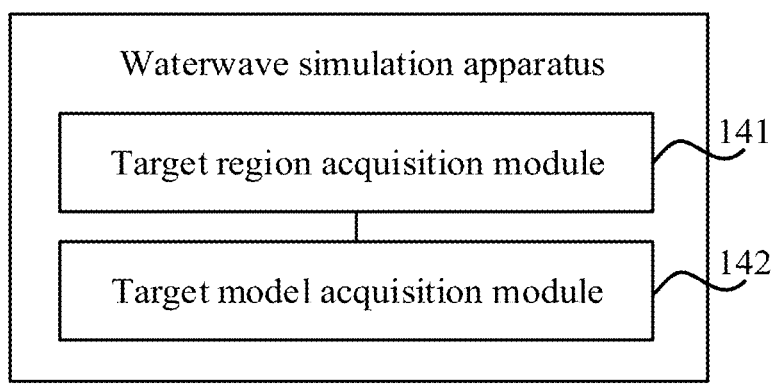
FIG. 14 is a block diagram illustrating a waterwave simulation apparatus according to an exemplary embodiment.

On the basis of the waterwave simulation method provided by an embodiment of the present disclosure, an embodiment of the present disclosure provides a waterwave simulation apparatus, which, referring to FIG. 14, includes:

a target region acquisition module 141, configured to, in response to detecting that waterwaves need to be acquired during simulation on an initial model, acquire one or more target regions corresponding to the waterwaves and one or more slots corresponding to the one or more target regions; and a target model acquisition module 142, configured to obtain a target model by attaching the one or more slots to the initial model, where an effect of waterwaves is present in the one or more target regions of the target model.

In an embodiment, the target region acquisition module includes:

a first image acquisition module, configured to obtain one or more first images by acquiring and processing one or more bitmap images; and a second image acquisition module, configured to obtain one or more second images by processing the one or more first images, where the one or more second images are used as the one or more slots corresponding to the one or more target regions.

In an embodiment, the first image acquisition module includes:

a target point acquisition sub-module, configured to for each of the one or more bitmap images, acquire a target point in the bitmap image and a normal corresponding to the target point, where the normal is a straight line passing through the target point and parallel to a z-axis in a bitmap image coordinate system;

a transformation data acquisition sub-module, configured to acquire transformation data of pixels around the target point with the normal corresponding to the target point as reference and in conjunction with a preset angle in noise data, and determine to-be-processed pixels according to the target point;

a transformation matrix acquisition sub-module, configured to determine a transformation matrix corresponding to the bitmap image according to the transformation data and the to-be-processed pixels; and a first image acquisition sub-module, configured to obtain the one or more first images by adjusting the one or more bitmap images according to respective transformation matrices.

In an embodiment, the target point acquisition sub-module includes:

a center point acquisition unit, configured to acquire a mapping point and a center point of the bitmap image, where the mapping point indicates a corresponding start point obtained by mapping a coordinate origin of the bitmap image coordinate system to a world coordinate system;

a first midpoint acquisition unit, configured to acquire a midpoint of a line between the mapping point and the center point to obtain a first midpoint;

a target point acquisition unit, configured to, in response to detecting that the first midpoint is located within the bitmap image, determine the first midpoint as the target point;

a second midpoint acquisition unit, configured to, in response to detecting that the first midpoint is located outside the bitmap image, acquire a midpoint of a line between a preset point and the center point of the bitmap image to obtain a second midpoint; and a target point acquisition unit, configured to determine the second midpoint as the target point.

In an embodiment, the transformation data acquisition sub-module includes:

a candidate pixel acquisition unit, configured to acquire candidate pixels that satisfy a first screening condition in the bitmap image, where the first screening condition includes at least one of for pixel values of a candidate pixel, a red pixel value is less than or equal to a red pixel threshold, a green pixel value exceeds a green pixel threshold, and a blue pixel value exceeds a first blue pixel threshold and a second blue pixel threshold, where the second blue pixel threshold is greater than the first blue pixel threshold;

a spacing distance acquisition unit, configured to determine a spacing distance between two adjacent pixels in the bitmap image according to a size of the bitmap image and a size of a display region of a display screen; and a to-be-processed pixel acquisition unit, configured to, in response to determining that a second screening condition is not satisfied, repeatedly execute a step of, with a specified point as a start point, moving the specified point by the spacing distance in different directions in sequence until pixels at corresponding positions are non-candidate pixels or the corresponding positions exceed a boundary of the bitmap image, and determine candidate pixels at the corresponding positions as the to-be-processed pixels, where the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

It should be noted that, the apparatus shown in this embodiment matches the contents in the method embodiment, and therefore, for details, reference may be made to the contents in the method embodiment, which will not be repeated here.

In an exemplary embodiment, there is provided an electronic device, including:

a processor;

a memory for storing a computer program executable by the processor;

where the processor is configured to execute the computer program in the memory to execute the steps in the method as shown in FIG. 1.

In an exemplary embodiment, there is provided a non-volatile computer readable storage medium such as a memory including instructions. The executable computer program described above can be executed by a processor. The readable storage medium may be ROM, random access memory (RAM), CD-ROM, magnetic tape, floppy disk, optical data storage device, and the like.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

I claim:

1. A waterwave simulation method, comprising:

in response to detecting that waterwaves need to be acquired during simulation on an initial model, acquiring one or more target regions corresponding to the waterwaves and one or more slots corresponding to the one or more target regions; and obtaining a target model by attaching the one or more slots to the initial model, wherein an effect of waterwaves is present in the one or more target regions of the target model;

wherein acquiring the one or more slots corresponding to the one or more target regions comprises:

obtaining one or more first images by acquiring and processing one or more bitmap images; and obtaining one or more second images by processing the one or more first images, wherein the one or more second images are used as the one or more slots corresponding to the one or more target regions;

wherein obtaining the one or more first images by processing the one or more bitmap images comprises:

for each of the one or more bitmap images, acquiring a target point in the bitmap image and a normal corresponding to the target point, wherein the normal is a straight line passing through the target point and parallel to a z-axis in a bitmap image coordinate system;

acquiring transformation data of pixels around the target point with the normal corresponding to the target point as reference and in conjunction with a preset angle in noise data, and determining to-be-processed pixels according to the target point;

determining a transformation matrix corresponding to the bitmap image according to the transformation data and the to-be-processed pixels; and obtaining the one or more first images by adjusting the one or more bitmap images according to respective transformation matrices.

2. The method according to claim 1, wherein acquiring the target point in the bitmap image comprises:

acquiring a mapping point and a center point of the bitmap image, wherein the mapping point indicates a corresponding start point obtained by mapping a coordinate origin of the bitmap image coordinate system to a world coordinate system;

acquiring a midpoint of a line between the mapping point and the center point to obtain a first midpoint;

in response to detecting that the first midpoint is located within the bitmap image, determining the first midpoint as the target point;

in response to detecting that the first midpoint is located outside the bitmap image, acquiring a midpoint of a line between a preset point and the center point of the bitmap image to obtain a second midpoint; and determining the second midpoint as the target point.

3. The method according to claim 1, wherein determining the to-be-processed pixels according to the target point comprises:

acquiring candidate pixels that satisfy a first screening condition in the bitmap image, wherein the first screening condition includes at least one of: for pixel values of a candidate pixel, a red pixel value is less than or equal to a red pixel threshold, a green pixel value exceeds a green pixel threshold, and a blue pixel value exceeds a first blue pixel threshold and a second blue pixel threshold, wherein the second blue pixel threshold is greater than the first blue pixel threshold;

determining a spacing distance between two adjacent pixels in the bitmap image according to a size of the bitmap image and a size of a display region of a display screen; and in response to determining that a second screening condition is not satisfied, repeatedly executing a step of, with a specified point as a start point, moving the specified point by the spacing distance in different directions in sequence until pixels at corresponding positions are non-candidate pixels or the corresponding positions exceed a boundary of the bitmap image, and determining candidate pixels at the corresponding positions as the to-be-processed pixels, wherein the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

4. An electronic device, comprising:

a processor;

a memory for storing a computer program executable by the processor;

wherein the processor is configured to execute the computer program in the memory to implement operations comprising:

in response to detecting that waterwaves need to be acquired during simulation on an initial model, acquiring one or more target regions corresponding to the waterwaves and one or more slots corresponding to the one or more target regions; and obtaining a target model by attaching the one or more slots to the initial model, wherein an effect of waterwaves is present in the one or more target regions of the target model;

wherein acquiring the one or more slots corresponding to the one or more target regions comprises:

obtaining one or more first images by acquiring and processing one or more bitmap images; and obtaining one or more second images by processing the one or more first images, wherein the one or more second images are used as the one or more slots corresponding to the one or more target regions;

wherein obtaining the one or more first images by processing the one or more bitmap images comprises:

for each of the one or more bitmap images, acquiring a target point in the bitmap image and a normal corresponding to the target point, wherein the normal is a straight line passing through the target point and parallel to a z-axis in a bitmap image coordinate system;

acquiring transformation data of pixels around the target point with the normal corresponding to the target point as reference and in conjunction with a preset angle in noise data, and determining to-be-processed pixels according to the target point;

determining a transformation matrix corresponding to the bitmap image according to the transformation data and the to-be-processed pixels; and obtaining the one or more first images by adjusting the one or more bitmap images according to respective transformation matrices.

5. A non-volatile computer readable storage medium, wherein an executable computer program in the storage medium is executed by a processor to implement operations comprising:

in response to detecting that waterwaves need to be acquired during simulation on an initial model, acquiring one or more target regions corresponding to the waterwaves and one or more slots corresponding to the one or more target regions; and obtaining a target model by attaching the one or more slots to the initial model, wherein an effect of waterwaves is present in the one or more target regions of the target model;

wherein acquiring the one or more slots corresponding to the one or more target regions comprises:

obtaining one or more first images by acquiring and processing one or more bitmap images; and obtaining one or more second images by processing the one or more first images, wherein the one or more second images are used as the one or more slots corresponding to the one or more target regions;

wherein obtaining the one or more first images by processing the one or more bitmap images comprises:

for each of the one or more bitmap images, acquiring a target point in the bitmap image and a normal corresponding to the target point, wherein the normal is a straight line passing through the target point and parallel to a z-axis in a bitmap image coordinate system;

acquiring transformation data of pixels around the target point with the normal corresponding to the target point as reference and in conjunction with a preset angle in noise data, and determining to-be-processed pixels according to the target point;

determining a transformation matrix corresponding to the bitmap image according to the transformation data and the to-be-processed pixels; and obtaining the one or more first images by adjusting the one or more bitmap images according to respective transformation matrices.

6. The electronic device according to claim 5, wherein acquiring the target point in the bitmap image comprises:

acquiring a mapping point and a center point of the bitmap image, wherein the mapping point indicates a corresponding start point obtained by mapping a coordinate origin of the bitmap image coordinate system to a world coordinate system;

acquiring a midpoint of a line between the mapping point and the center point to obtain a first midpoint;

in response to detecting that the first midpoint is located within the bitmap image, determining the first midpoint as the target point;

in response to detecting that the first midpoint is located outside the bitmap image, acquiring a midpoint of a line between a preset point and the center point of the bitmap image to obtain a second midpoint; and determining the second midpoint as the target point.

7. The electronic device according to claim 5, wherein determining the to-be-processed pixels according to the target point comprises:

acquiring candidate pixels that satisfy a first screening condition in the bitmap image, wherein the first screening condition includes at least one of: for pixel values of a candidate pixel, a red pixel value is less than or equal to a red pixel threshold, a green pixel value exceeds a green pixel threshold, and a blue pixel value exceeds a first blue pixel threshold and a second blue pixel threshold, wherein the second blue pixel threshold is greater than the first blue pixel threshold;

determining a spacing distance between two adjacent pixels in the bitmap image according to a size of the bitmap image and a size of a display region of a display screen; and in response to determining that a second screening condition is not satisfied, repeatedly executing a step of, with a specified point as a start point, moving the specified point by the spacing distance in different directions in sequence until pixels at corresponding positions are non-candidate pixels or the corresponding positions exceed a boundary of the bitmap image, and determining candidate pixels at the corresponding positions as the to-be-processed pixels, wherein the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

8. The storage medium according to claim 5, wherein acquiring the target point in the bitmap image comprises:

acquiring a mapping point and a center point of the bitmap image, wherein the mapping point indicates a corresponding start point obtained by mapping a coordinate origin of the bitmap image coordinate system to a world coordinate system;

acquiring a midpoint of a line between the mapping point and the center point to obtain a first midpoint;

in response to detecting that the first midpoint is located within the bitmap image, determining the first midpoint as the target point;

in response to detecting that the first midpoint is located outside the bitmap image, acquiring a midpoint of a line between a preset point and the center point of the bitmap image to obtain a second midpoint; and determining the second midpoint as the target point.

9. The storage medium according to claim 5, wherein determining the to-be-processed pixels according to the target point comprises:

acquiring candidate pixels that satisfy a first screening condition in the bitmap image, wherein the first screening condition includes at least one of: for pixel values of a candidate pixel, a red pixel value is less than or equal to a red pixel threshold, a green pixel value exceeds a green pixel threshold, and a blue pixel value exceeds a first blue pixel threshold and a second blue pixel threshold, wherein the second blue pixel threshold is greater than the first blue pixel threshold;

determining a spacing distance between two adjacent pixels in the bitmap image according to a size of the bitmap image and a size of a display region of a display screen; and in response to determining that a second screening condition is not satisfied, repeatedly executing a step of, with a specified point as a start point, moving the specified point by the spacing distance in different directions in sequence until pixels at corresponding positions are non-candidate pixels or the corresponding positions exceed a boundary of the bitmap image, and determining candidate pixels at the corresponding positions as the to-be-processed pixels, wherein the second screening condition includes: pixels at corresponding positions are located outside the bitmap image or there is no pixel at the corresponding positions after the specified point is moved by the spacing distance, and the specified point includes the target point or respective first candidate pixels that follow the non-candidate pixels.

* * * * *